(No Model.)
J. D. LAMBERT, Sr., & J. G. WIGGINS.
COTTON WORM DESTROYER, SPRINKLER, &c.
No. 294,135. Patented Feb. 26, 1884.
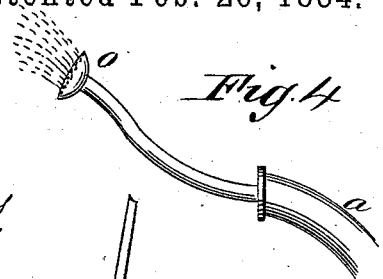
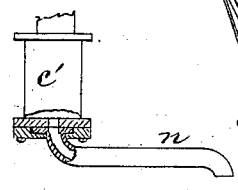
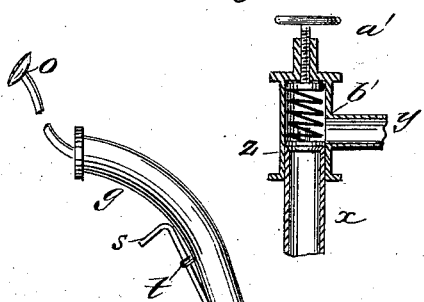
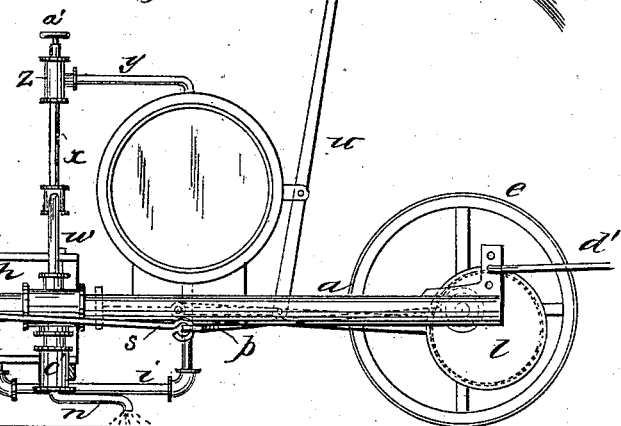
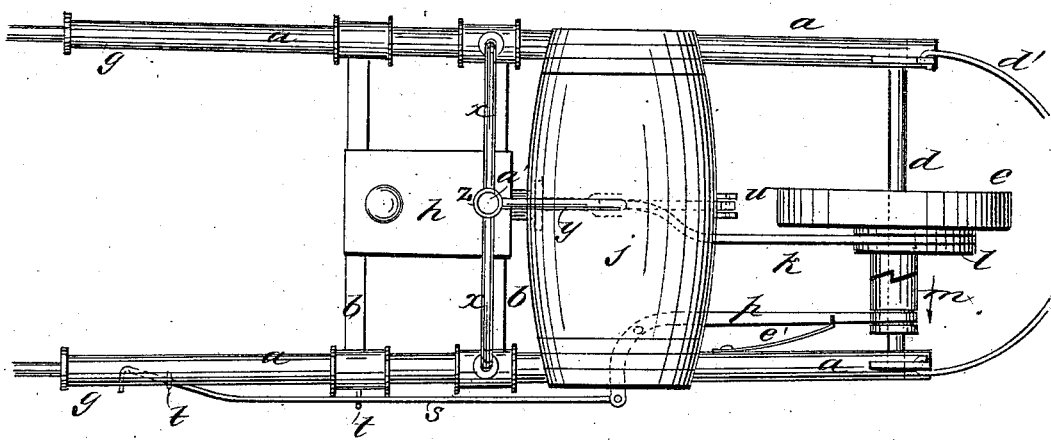
WITNESSES:
Francis McArdle
C. Sedgwick
INVENTOR:
J. D. Lambert Sr
J. G. Wiggins
BY Munn & Co
ATTORNEYS.

UNITED STATES PATENT OFFICE.

JOHN D. LAMBERT, SR., AND JOHN GILLMORE WIGGINS, OF MONROEVILLE, ALABAMA.

COTTON-WORM DESTROYER, SPRINKLER, &c.

SPECIFICATION forming part of Letters Patent No. 294,135, dated February 26, 1884.

Application filed August 20, 1883. (No model.)

*To all whom it may concern:*

Be it known that we, JOHN D. LAMBERT, Sr., and JOHN GILLMORE WIGGINS, both of Monroeville, in the county of Monroe and State of Alabama, have invented a new and Improved Cotton-Worm Destroyer, Sprinkler, &c., of which the following is a full, clear, and exact description.

The invention will first be described in connection with the drawings, and then pointed out in the claims.

Reference is to be had to the accompanying drawings, forming part of this specification, in which similar letters of reference indicate corresponding parts in all the figures.

Figure 1 is a side elevation of our improved machine. Fig. 2 is a plan view of said machine. Fig. 3 is a sectional elevation of the pressure-regulating valve. Fig. 4 is a detail of one of the rear sprinklers in side elevation, and Fig. 5 is a detail sectional view of the swinging nozzle.

We make a truck of tubular side bars, $a$, cross-bars $b$, axle $d$, wheel $e$, and caster-wheels $f$ when required, the said side bars being suitably bent upward at the rear for handles $g$, by which to guide and operate the truck. On the cross-bars $b$ we arrange a force-pump, $h$, having connection by a suction-pipe, $i$, with the liquid-tank $j$, located ahead of said pump on the side bars, $a$, and being geared with the axle $d$ by rod $k$, eccentric $l$, and clutch $m$, to eject the liquid to be distributed through nozzles $n$, located under the side bars, or sprinklers $o$, extended back from the handles $g$, as may be required by the kind and condition of the plants to be treated. The clutch $m$ is employed to connect the eccentric to the shaft, in order that the pump may be disconnected at any time when it may not be required to work. For shifting the clutch at the will of the operator, an elbow-lever, $p$, is connected with it, and a rod, $s$, for working the lever, extends from said lever along one of the side bars, $a$, through eye-studs $t$ for guides, to the handle of said side bar, where said rod also terminates in a suitable handle for working it. Besides the eccentric $l$, we also provide a hand-lever, $u$, to work the pump with when the machine is not working, the rod $k$ and said lever being interchangeably connected with the pump-plunger. We provide a return-pipe connection, $w$, $x$, and $y$, between the side bars, $a$, and the tank $j$, in which is a pressure-regulating valve, $z$, that opens and allows some of the liquid to return to the tank when the pressure is too great. Said valve is variable by the adjusting-screw $a'$ and the spring $b'$ to set it for different pressures. This valve is more particularly useful when the machine is to be used for sprinkling plants with poisonous liquids for destroying insects, to equalize the streams or jets, and make them steady and uniform. The nozzles $n$ are fitted to the connections $c'$, so that they can swing out or in, to adapt them for sprinkling two rows of plants at the same time, whether planted widely apart or close together.

The sprinklers $o$ are to be used on plants of larger growth, and they are extended back of the handles to discharge the poison-liquid behind the operator for his protection.

The front end of the machine has a bail, $d'$, hooked on, for the purpose of hitching on a horse or mule to draw the same when required.

The rod $s$ is mainly used to disconnect the clutch $m$ and hold it out of connection with the eccentric. The spring $e'$ shifts the clutch into gear with the eccentric.

Having thus described our invention, what we claim as new, and desire to secure by Letters Patent, is—

1. The combination, with a pump, tank, and sprinkling devices, of a three-wheeled vehicle having side bars, $a$ $a$, turned up to form handles $g$ $g$ at the requisite height for a man to hold and guide the machine or propel without lift.

2. In a sprinkler, the combination, with a liquid-tank and a pump for raising the liquid in said tank, of the turned-up tubular bars $a$, provided with the sprinklers $o$ at their upper rear ends, substantially as shown and described, whereby the liquid may be distributed back of the operator, as set forth.

JOHN D. LAMBERT, SR.
JOHN GILLMORE WIGGINS.

Witnesses:
W. R. AGEE,
K. E. ROTHSCHILD.